US006794841B1

(12) United States Patent
Vang et al.

(10) Patent No.: US 6,794,841 B1
(45) Date of Patent: Sep. 21, 2004

(54) METHOD OF AND APPARATUS FOR LOCKING A POWERED MOVABLE FURNITURE ITEM

(75) Inventors: David Vang, Adell, WI (US); Kenneth G. Seidl, Port Washington, WI (US); Greg Elliott, Port Washington, WI (US)

(73) Assignee: Raffel Product Development, Saukville, WI (US)

( * ) Notice: Subject to any disclaimer, the term of this patent is extended or adjusted under 35 U.S.C. 154(b) by 0 days.

(21) Appl. No.: 10/269,114

(22) Filed: Oct. 10, 2002

Related U.S. Application Data

(63) Continuation-in-part of application No. 09/850,718, filed on May 8, 2001, now Pat. No. 6,492,786.

(60) Provisional application No. 60/203,168, filed on May 8, 2000.

(51) Int. Cl.[7] .................................................. H02P 1/00

(52) U.S. Cl. ....................... 318/553; 318/550; 318/466; 318/17; 297/19; 297/330; 297/DIG. 4; 297/DIG. 7; 297/DIG. 10

(58) Field of Search .......................... 318/17, 550, 553, 318/552, 466; 297/19, 330, DIG. 4, DIG. 7, DIG. 10

(56) References Cited

U.S. PATENT DOCUMENTS

| | | | | |
|---|---|---|---|---|
| 3,414,324 A | | 12/1968 | Taylor et al. | |
| 3,596,991 A | | 8/1971 | Mckee | |
| 3,804,460 A | | 4/1974 | Leffler | |
| 3,952,343 A | | 4/1976 | Wong | |
| 4,141,095 A | | 2/1979 | Adachi | |
| 4,159,496 A | * | 6/1979 | Stevens | 361/1 |
| 4,541,671 A | | 9/1985 | Broadhead et al. | |
| 4,552,403 A | | 11/1985 | Yindra | |
| 4,570,995 A | | 2/1986 | Rogers et al. | |
| 4,797,924 A | | 1/1989 | Schnars et al. | |
| 4,941,221 A | | 7/1990 | Kanzler | |
| 5,064,244 A | * | 11/1991 | Sproule | 297/68 |
| 5,088,138 A | | 2/1992 | Munster | |
| 5,107,555 A | | 4/1992 | Thrasher | |
| 5,214,360 A | | 5/1993 | Gonser et al. | |
| 5,230,113 A | | 7/1993 | Foster et al. | |
| 5,274,862 A | | 1/1994 | Palmer, Jr. et al. | |
| 5,335,313 A | | 8/1994 | Douglas | |
| 5,467,002 A | * | 11/1995 | Brooks | 318/553 |
| 5,624,155 A | | 4/1997 | Bluen et al. | |
| 5,730,494 A | | 3/1998 | LaPointe et al. | |
| 5,765,840 A | | 6/1998 | Tame | |
| 5,777,571 A | | 7/1998 | Chuang | |
| 5,800,009 A | | 9/1998 | Grandfield | |
| 5,812,978 A | | 9/1998 | Nolan | |
| 5,836,645 A | * | 11/1998 | Sakaue et al. | 297/68 |

(List continued on next page.)

FOREIGN PATENT DOCUMENTS

WO 95/12377 5/1995

*Primary Examiner*—Rina Duda

(74) *Attorney, Agent, or Firm*—Michael Best & Friedrich LLP

(57) ABSTRACT

A powered movable chair controllable by a user. The chair includes a frame, a powered apparatus mounted to the frame to power the movable chair, and a controller including a control circuit coupled to the powered apparatus. The control circuit includes at least two switches for selectively controlling a change of the status of the powered apparatus between a locked state and an unlocked state. The control circuit is operable to generate an output signal allowing control of the powered apparatus in the unlocked state and preventing control of the powered apparatus in the locked state. The control circuit is further operable to change from the unlocked state to the locked state when a user operates a first switch of the at least two switches, and to change from the locked state to the unlocked state when a user operates a second switches of the at least two switches for a predefined time period.

12 Claims, 10 Drawing Sheets

U.S. PATENT DOCUMENTS

| | | | |
|---|---|---|---|
| 5,853,005 A | 12/1998 | Scanlon | |
| 5,884,350 A | 3/1999 | Kurze | |
| 5,931,532 A | 8/1999 | Kemmerer et al. | |
| 5,969,488 A | 10/1999 | Fromson | |
| 6,108,592 A | 8/2000 | Kurtzberg et al. | |
| 6,290,661 B1 | 9/2001 | Cutler et al. | |
| 6,320,510 B2 * | 11/2001 | Menkedick et al. | 340/573.1 |

* cited by examiner

METHOD OF AND APPARATUS FOR LOCKING A POWERED MOVABLE FURNITURE ITEM

RELATED APPLICATIONS

This is a continuation-in-part patent application of prior filed U.S patent application Ser. No. 09/850,718, filed on May 8, 2001, now U.S. Pat. No. 6,492,786, which claims the benefit of prior filed co-pending U.S. provisional patent application number 60/203,168, filed on May 8, 2000.

BACKGROUND OF THE INVENTION

The invention relates to a method of and apparatus for locking a feature of a powered furniture item, and particularly to an electric lockout for selectively preventing actuation of one or more features of the furniture item.

It is known to provide furniture items with various electrically powered features or apparatus. Examples of such powered apparatus include, but are not limited to:

1) one or more motors, or a hydraulic system connected to a stationary lift and/or recline chair, dental or medical chair, sofa, love seat, bed, futon, etc;

2) one or more heater elements (either temporarily or permanently) connected to a stationary lift and/or recline chair, dental or medical chair, sofa, love seat, bed, futon, etc;

3) one or more vibrating elements (either temporarily or permanently) connected to a stationary lift and/or recline chair, dental or medical chair, sofa, love seat, bed, futon, etc; or 4) an air bladder system connected to a stationary lift and/or recline chair, dental or medical chair, sofa, love seat, bed, futon, etc.

An example of a system having one or more vibrating elements is shown in U.S. Pat. No. 5,730,707, entitled POWER SUPPLY FOR VIBRATING FURNITURE, which is incorporated herein by reference. An example of a system having a hydraulic lift system and at least one motor is shown in U.S. Pat. No. 5,467,002, entitled ADJUSTABLE CHAIR HAVING PROGRAMMABLE CONTROL SWITCHES, which is incorporated herein by reference.

One example of a furniture item with a powered apparatus is a power-lift chair. Power-lift chairs help elderly, disabled or similarly situated individuals get into and out of the lift chair. For example, when the user wishes to sit in the lift chair, the user operates a controller to raise and rotate (hereinafter, referred to as "raise") the lift chair from a "normal" state. The term "normal" state refers to the normal resting position, i.e., the lift chair is not in the raised position. The user raises the lift chair to the desired height and rotation position thereby allowing the user to readily sit in the lift chair. By raising the lift chair, the user is allowed easier access to the chair. After the user sits in the lift chair, the user operates the controller to return the chair to the normal state. That is, the lift chair lowers and reverses the direction of rotation (hereinafter, referred to as "lowering") until it returns to the normal state. Similarly, if the user is sitting in the chair while the chair is in the normal state, the user can raise the lift chair thereby allowing the user to easily get out of the lift chair. The lift chair uses one or more electrical motors to raise and lower the chair.

Another example of a furniture item with a powered apparatus is a power-recline chair. Power-recline chairs allow a user to controllably recline the power-recline chair. As compared with a manual recline chair, the power-recline chair allows greater control and stability of the chair while reclining the chair. For example, the user operates a controller such that the power-recline chair moves to a desired reclined position. If the user is already in a reclined position, the user operates the controller until the chair returns to the upright position. Power-recline chairs utilize one or more electrical motors to move the chair between the recline and upright positions.

The functional utility of power-lift chairs and power-recline chairs can be combined into the same chair. That is, a lift and power-recline chair combines the features of the lift chair and the power-recline chair.

SUMMARY OF THE INVENTION

In some circumstances, it is desirable to prevent unauthorized use of the powered apparatus of the furniture item. For example, children should not be allowed to operate such items without proper supervision and/or training.

Accordingly, the invention provides a powered furniture item having an electronic lockout for preventing unauthorized use of the item. The powered furniture item has an unlocked state and a locked state. In the unlocked state, the item responds to user initiated commands generated by a controller. In the locked state, either the item does not respond to commands generated by the controller, or the controller is precluded from generating such commands.

In one embodiment, the invention provides a powered movable chair including a frame, a powered apparatus mounted to the frame to power the movable chair, and a controller including a control circuit coupled to the powered apparatus. The control circuit includes at least two switches for selectively controlling a change of the status of the powered apparatus between a locked state and an unlocked state. The control circuit is operable to generate an output signal allowing control of the powered apparatus in the unlocked state and preventing control of the powered apparatus in the locked state. The control circuit is further operable to change from the unlocked state to the locked state when a user operates only a first switch of the at least two switches, and to change from the locked state to the unlocked state when a user operates two switches of the at least two switches.

In another embodiment, the invention provides a powered movable chair including a frame, a powered apparatus mounted to the frame to power the movable chair, and a controller including a control circuit coupled to the powered apparatus. The control circuit includes at least two switches for selectively controlling a change of the status of the powered apparatus between a locked state and an unlocked state. The control circuit is operable to generate an output signal allowing control of the powered apparatus in the unlocked state and preventing control of the powered apparatus in the locked state. The control circuit is further operable to change from the unlocked state to the locked state when a user operates only a first switch of the at least two switches, and to change from the locked state to the unlocked state when a user operates a second switch of the at least two switches for predefined time period.

In a further embodiment, the invention provides a powered movable chair including a frame, a powered apparatus mounted to the frame to power the movable chair, and a controller including a control circuit coupled to the powered apparatus. The control circuit includes a switch for selectively controlling a change of the status of the powered apparatus between a locked state and an unlocked state. The control circuit is operable to generate an output signal allowing control of the powered apparatus in the unlocked state and preventing control of the powered apparatus in the locked state. The control circuit is further operable to change from the unlocked state to the locked state when a user operates the switch for a first predefined time period, and to change from the locked state to the unlocked state when a user operates the switch for a second predetermined time period.

The invention further provides a method of controlling a powered movable furniture item (e.g., a chair). In one embodiment, the method includes changing from the unlocked state to the locked state when the user operates only a first switch of the at least two switches, and changing from the locked state to the unlocked state when the user operates a second switch of the at least two switches for a predefined time period. In another embodiment, the method includes changing from the unlocked state to the locked state when the user operates a switch for a first predefined time period, and changing from the locked state to the unlocked state when the user operates the switch for a second predefined time period.

Other features and advantages of the invention will become apparent to those skilled in the art upon review of the following detailed description, claims, and drawings.

Figure 1B:
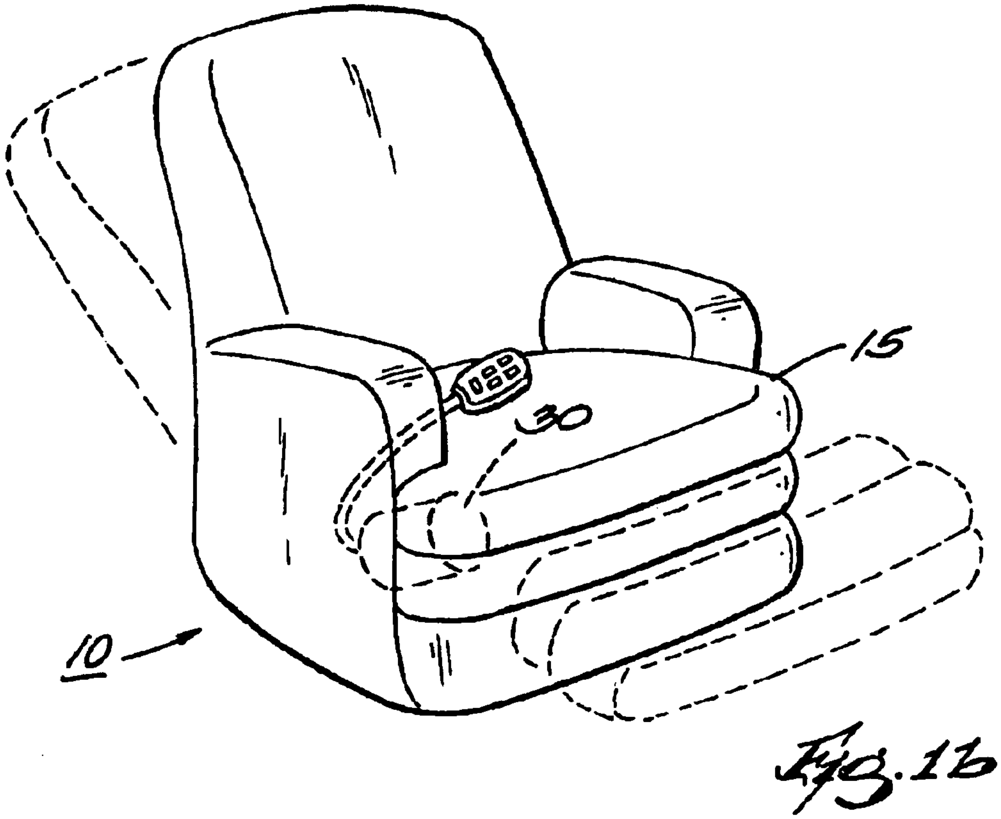
FIG. 1*b* is a perspective view of a power-assist chair capable of reclining.

Before any embodiments of the invention are explained in full detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. The use of "including", "comprising", "having" and variations thereof herein is meant to encompass the items listed thereafter and equivalents thereof as well as additional items.

DETAILED DESCRIPTION

Figure 1A:
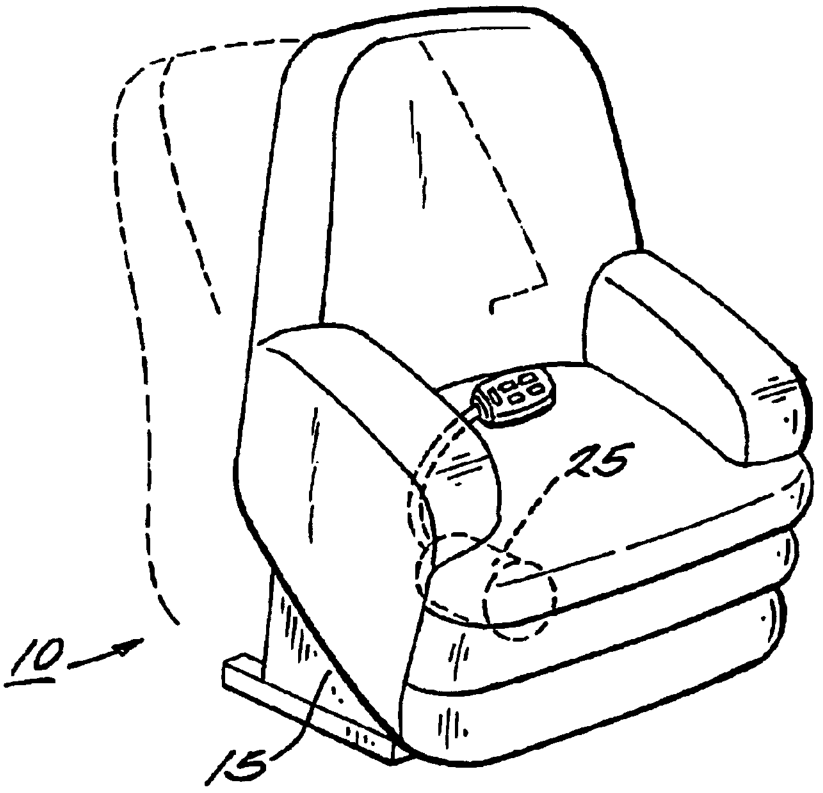
FIG. 1*a* is a perspective view of a power-assist chair capable of raising.
Figure 2:
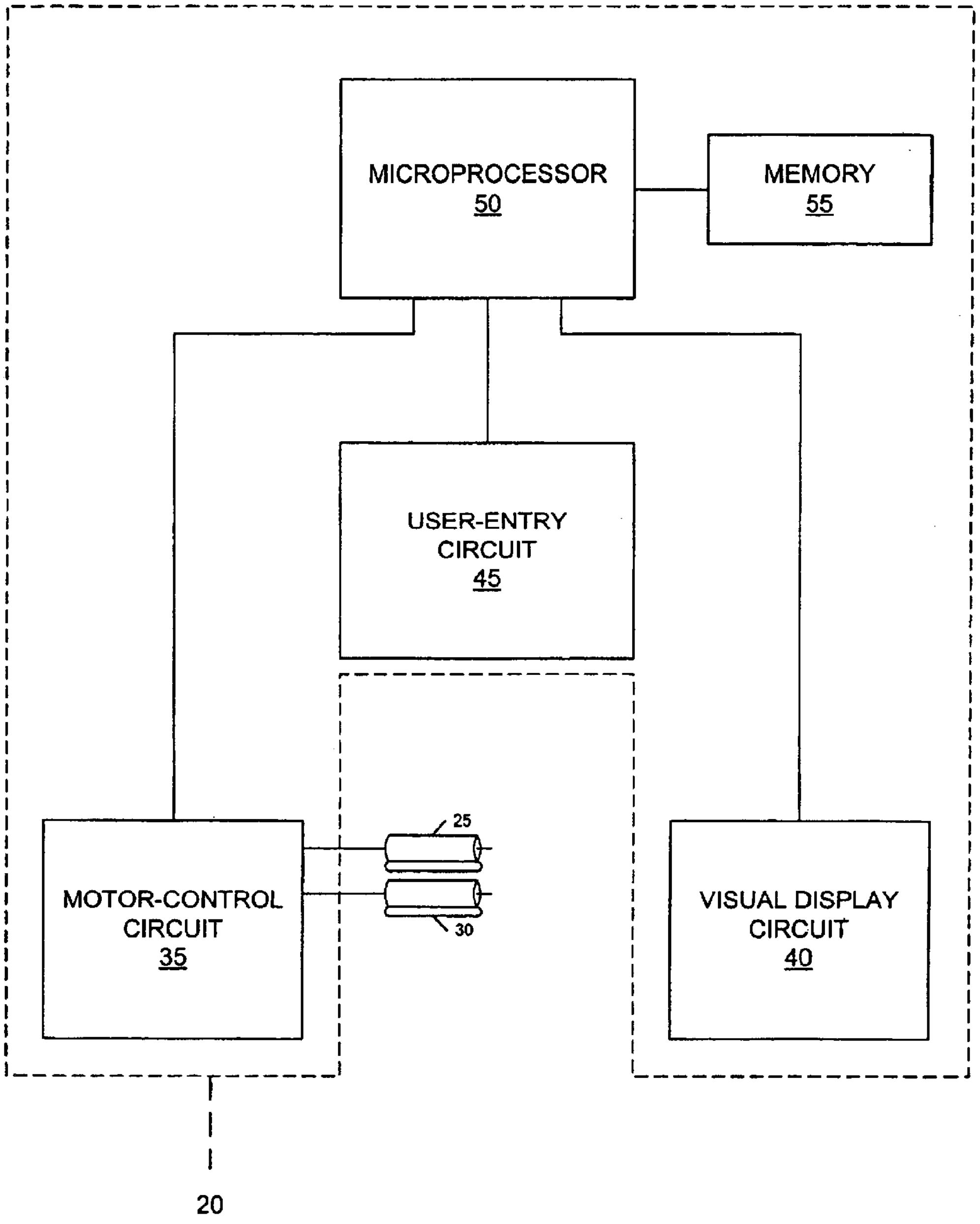
FIG. 2 is a schematic representation of a controller of the power-assist chair.
Figure 3:
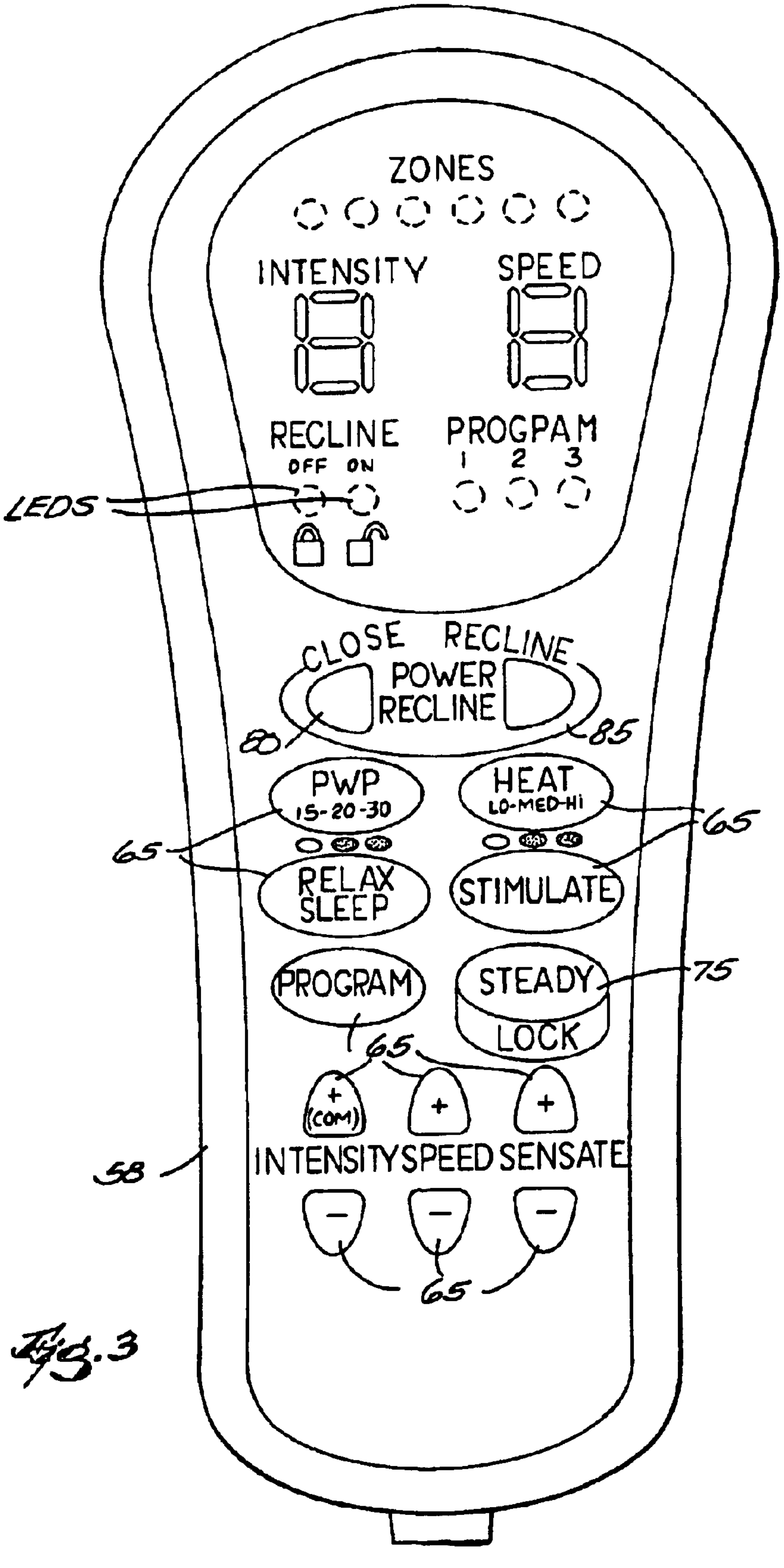
FIGS. 3–12 are top views of various embodiments of controller wands for the power-assist chair.
Figure 4:
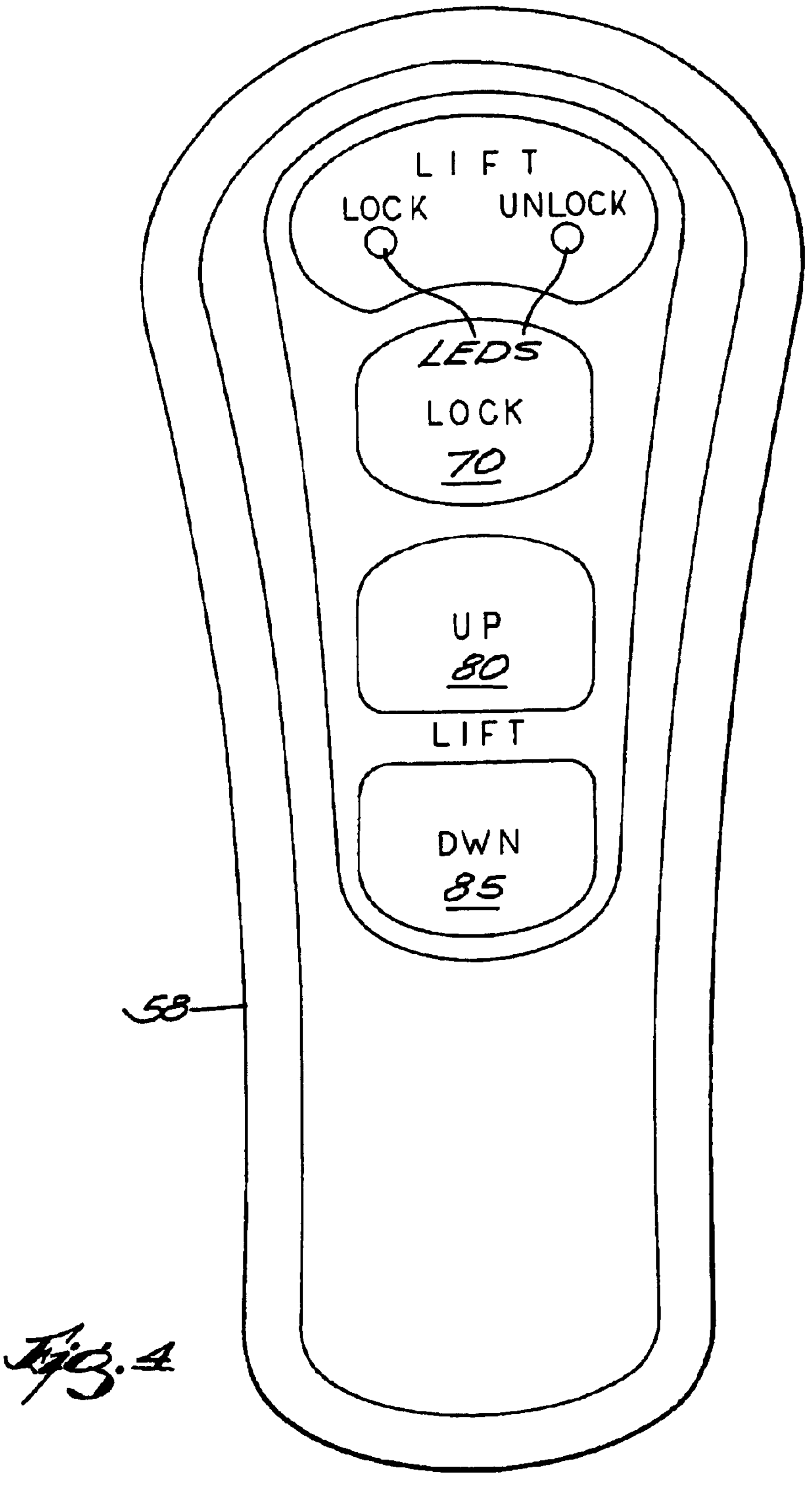
Figure 5:
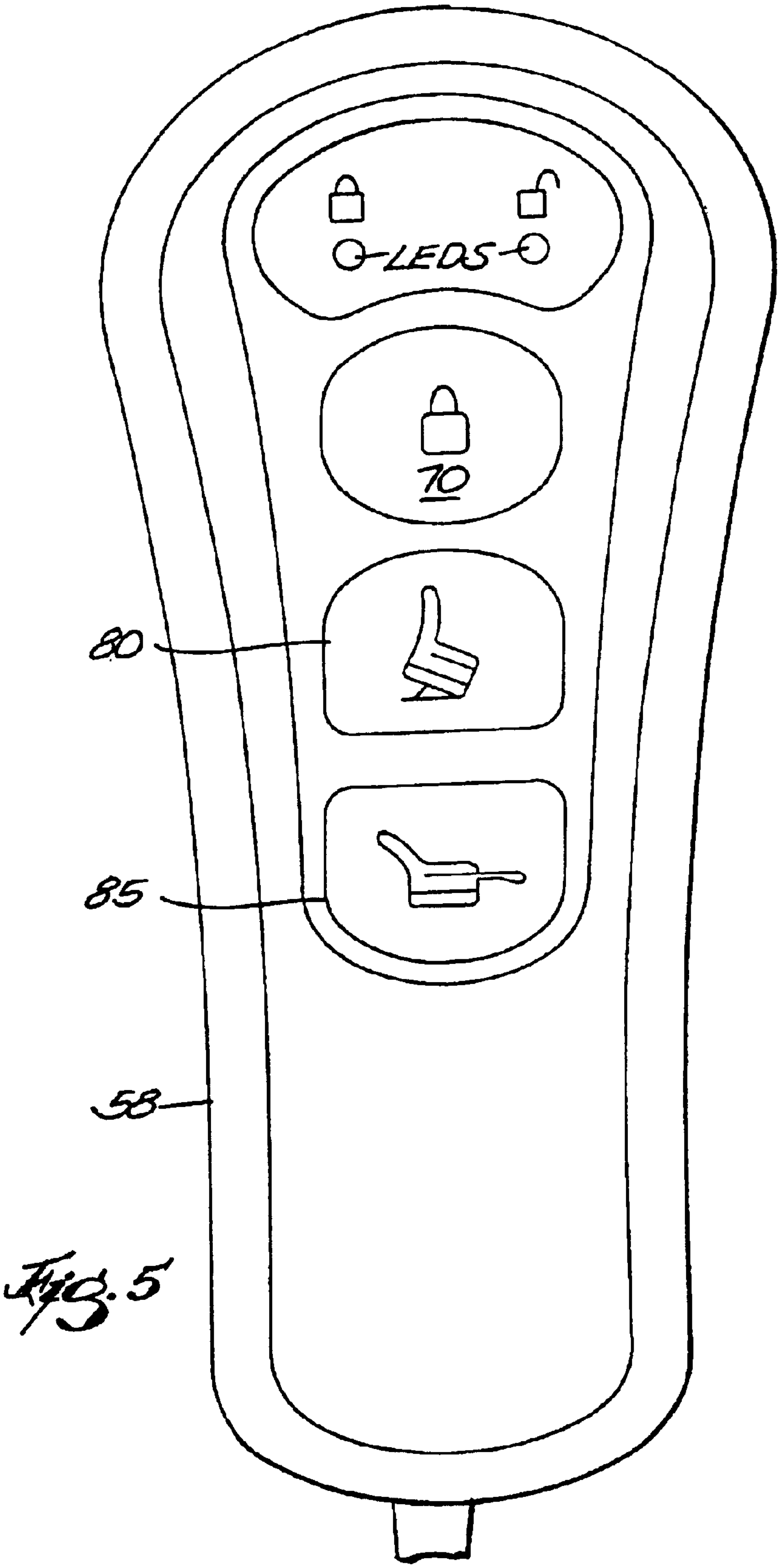
Figure 6:
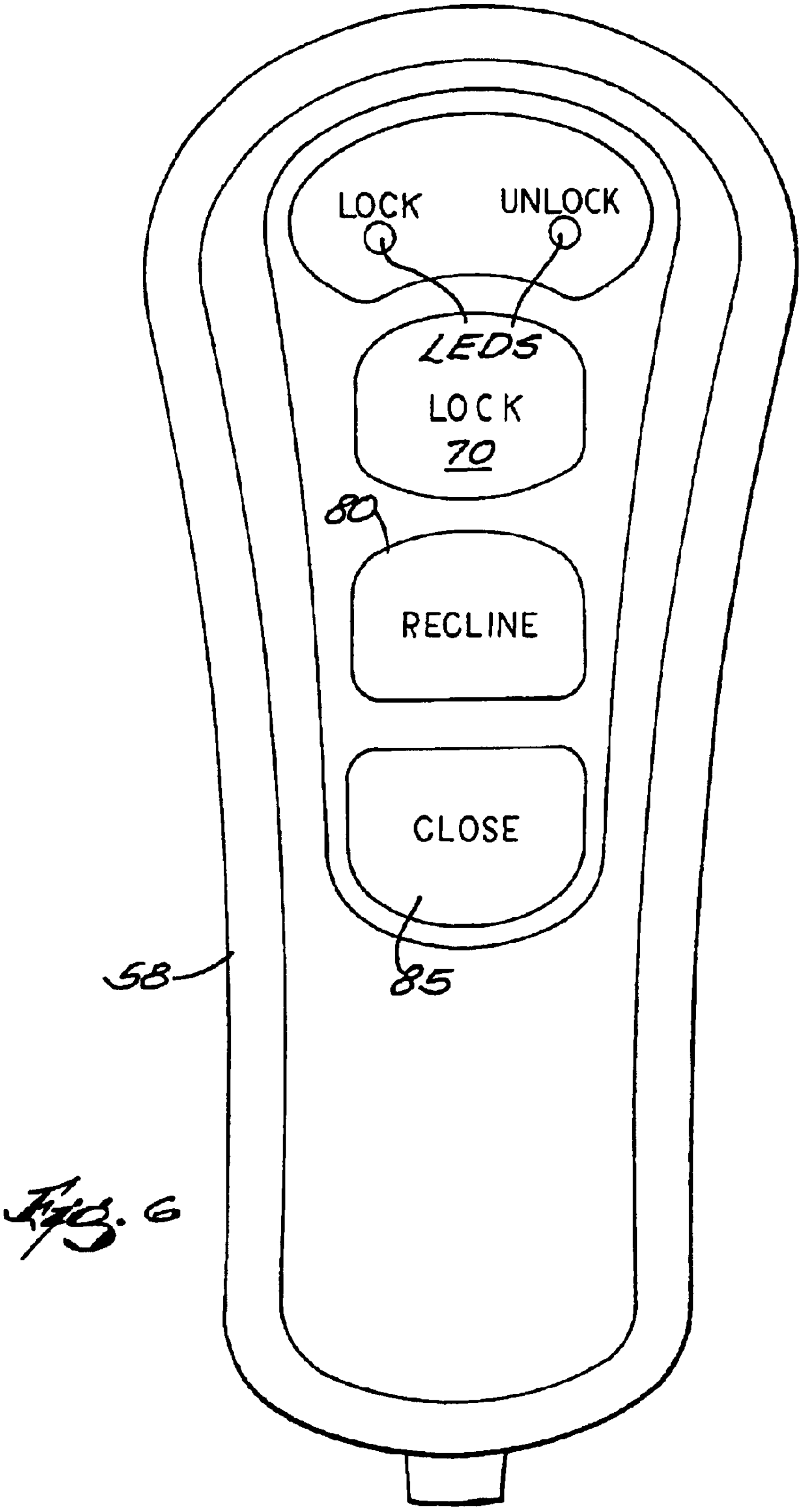
Figure 7:
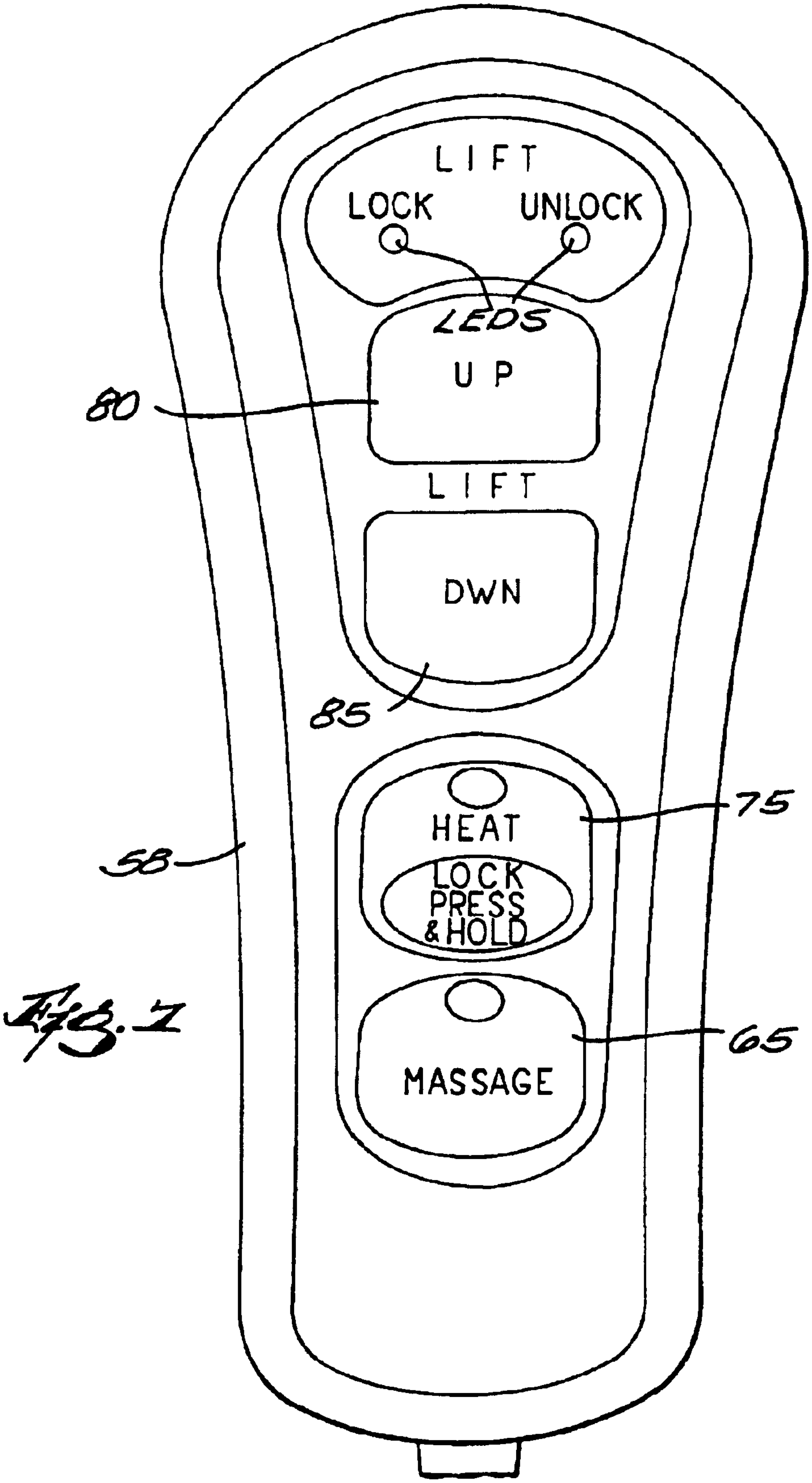
Figure 8:
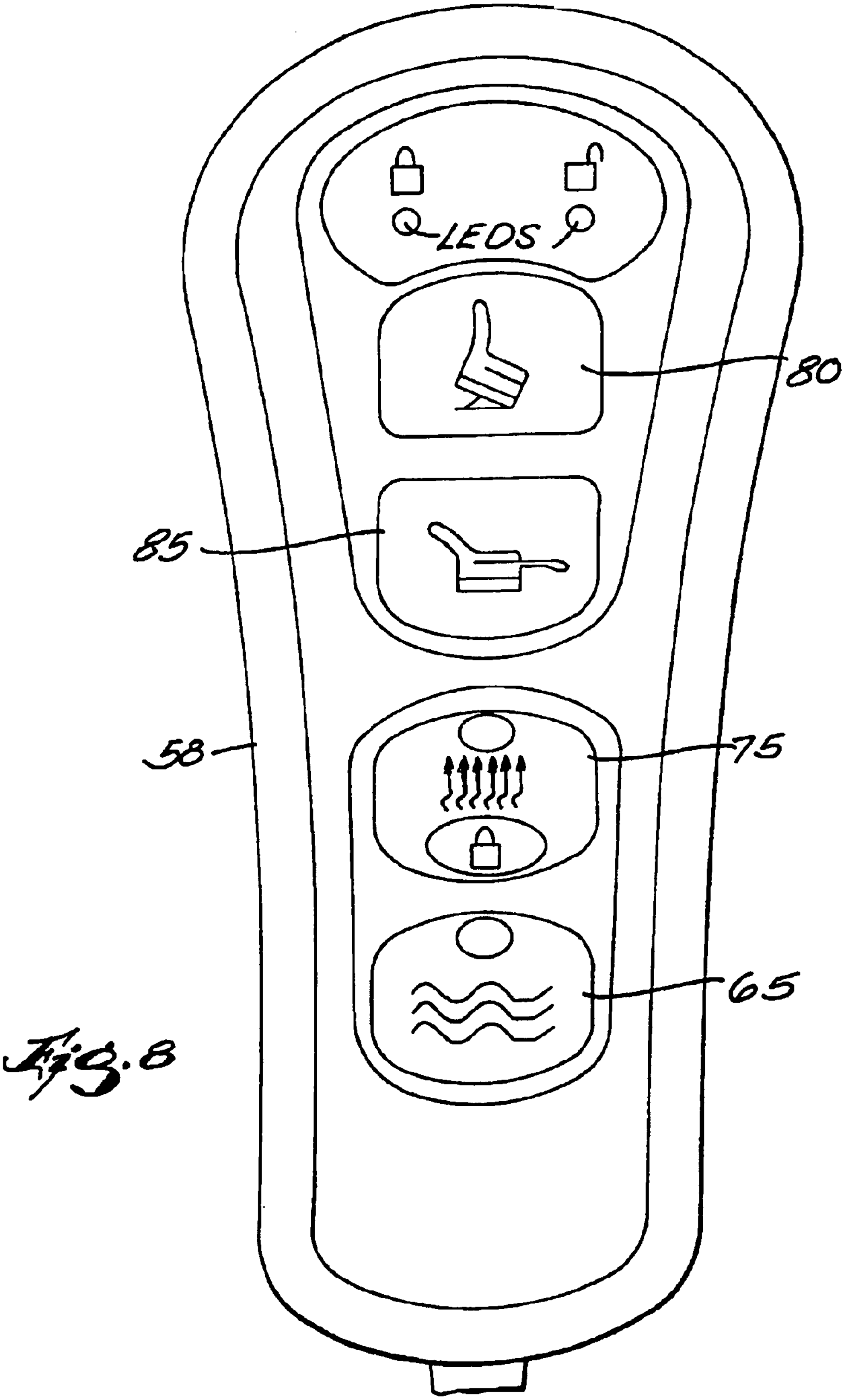

A power-assist chair 10 of the invention is shown in FIGS. 1*a* and 1*b*. Although the description below is for a power-assist chair, other furniture items having a powered apparatus may incorporate the invention. Example furniture items include substantially stationary chairs (e.g., a medical chair, a dental chair, a lift and/or recline chair, a sofa, a love seat, and similar furniture items) or sleeping furniture items (bed, futon, and similar furniture items). The power-assist chair 10 includes a frame 15, one or more powered apparatus mounted to the frame, and a control circuit 20 (FIG. 2). In the embodiment shown, the one or more powered apparatus includes a first motor 25 (FIG. 1*a*) coupled with a first mechanism (not shown) for raising and lowering the power-assist chair 10 as is known in the art, and a second motor 30 (FIG. 1*b*) coupled with a second mechanism (not shown) for reclining and returning the power-assist chair 10 as is known in the art. Other power apparatus may be used within the power-assist chair, including a hydraulic system, a heating system, a vibrating element, an air bladder system and similar apparatus.

As shown in FIG. 2, the control circuit 20 includes a motor-control circuit 35, a visual-display circuit 40, a user-entry circuit 45, a microprocessor 50, and memory 55. The motor-control circuit 35 is mounted to the frame 15, and the visual display circuit 40, the user-entry circuit 45, the microprocessor 50, and memory 55 are mounted within a hand-held controller. Although the embodiment shown in FIG. 2 includes a microprocessor 50 and memory 55, the control circuit may be implemented with or include any one, all or combination of integrated circuitry, a microprocessor and memory, and/or discrete circuitry. Example hand-held controllers 58 are shown in FIGS. 3–11. Other arrangements are possible including the motor-control circuit 35 being mounted to the frame or the motor-control circuit 35 being mounted within a controller (not shown).

The motor-control circuit 35 includes circuitry that receives control signals from the microprocessor 50, and activates and/or deactivates the first and second motors 25 and 30. An example motor-control circuit includes two H-bridge circuits. Other motor-control circuits may be used as is known in the art, and other power-apparatus-control circuits may be used depending on the attached power apparatus.

The visual-display circuit 40 provides a visual interface between the control circuit 20 and the user (not shown). The visual display circuit 40 receives signals from the microprocessor 50 and generates a visual output to the user. For example, the visual display circuit 40 includes a plurality of LEDs (shown in FIGS. 3–8) informing the user that the chair is in a locked state or an unlocked state. Other visual output devices (e.g., incandescent bulbs, LCD screens, etc.) may be used and other information may be conveyed from the control circuit 20 to the user.

The user entry circuit 45 provides an interface between the user and the control circuit 20, and allows the user to enter inputs or commands into the control circuit 20. The user entry circuit 45 includes a plurality of switches (e.g., push-button switches) that are actuated in response to the user pressing respective switches 65, 70, 75, 80, 85, 90, 95, 100, 105 and 120 (best shown in FIGS. 3–12). Actuation of the switches 65, 70, 75, 80, 85, 90, 95, 100, 105 and 120 cause the microprocessor 50 to provide control signals to the one or more power apparatus during the unlocked state. In one embodiment of the invention (see for example FIGS. 4, 5 and 6), the plurality of switches includes a dedicated disable or "lock" switch 70 (also shown in FIGS. 4, 5 and 6) that results in the control circuit 20 changing from an unlocked state to a locked state. In a second embodiment of the invention (see for example FIGS. 3, 7 and 8), the plurality of switches includes a switch 75 (also shown in FIGS. 3, 7 and 8) that may perform multiple functions where one of the functions results in the control circuit 20 changing from the unlocked state to the locked state. For either the first and second embodiments, the switches 70 or 75 include one and only one switch that results in the control circuit changing from an unlocked state to a locked state. The single "lock" switch 70 and the dual function switch 75 may also be referred to as a first select switch. For the embodiments shown in FIGS. 3–8, the plurality of switches includes switches 80 and 85. The switches 80 and 85 may be either dedicated or non-dedicated switches, actuation of which changes the control circuit 20 from a locked state to an unlocked state. The two switches 80 and 85 may be referred to as second and third select switches, respectively.

Figure 9:
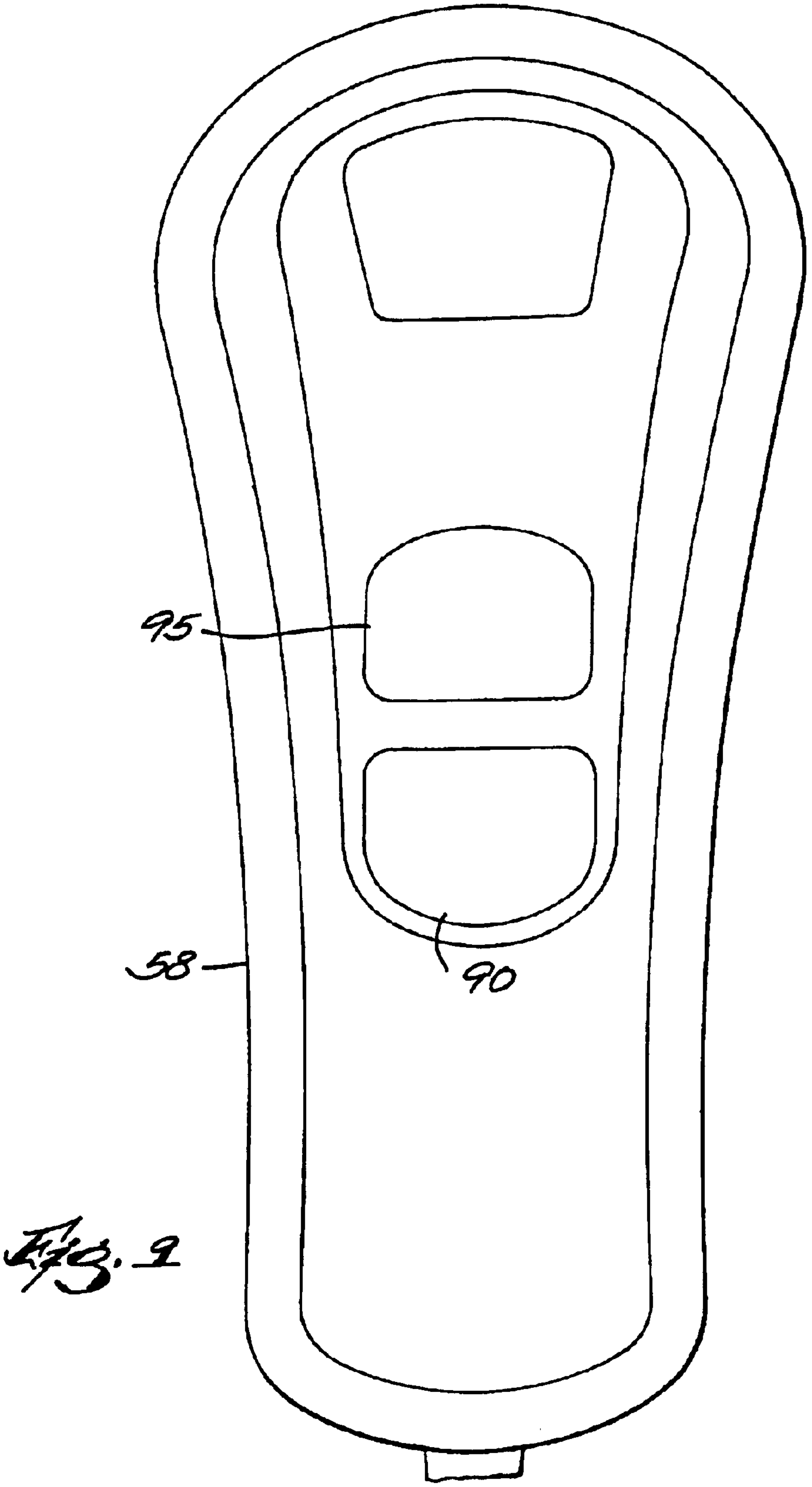

Another embodiment of the hand-held controller 58 is shown in FIG. 9. As shown in FIG. 9, the controller 58 includes at least two switches 90 and 95 for selectively controlling a change of the status of the powered apparatus between a locked state and an unlocked state. When a user operates only one of the at least two switches 90 and 95, the control circuit 20 changes from the unlocked state to the locked state. When a user operates two switches 90 and 95 of the at least two switches, the control circuit 20 changes from the locked state to the unlocked state. In a first configuration of FIG. 9, the control circuit 20 changes from the locked state to the unlocked state in response to the user operating the two switches 90 and 95 concurrently. In a second configuration of FIG. 9, the control circuit 20 changes from the locked state to the unlocked state in response to the user operating the two switches 90 and 95 sequentially.

Figure 11:
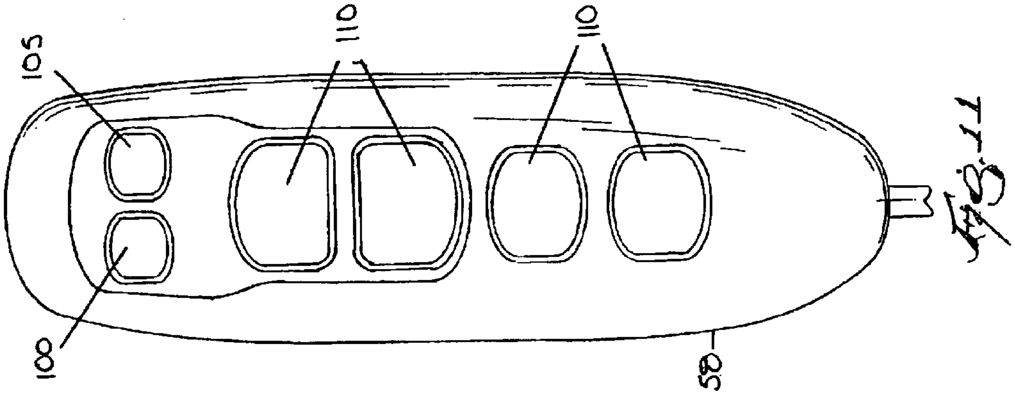
Figure 10:
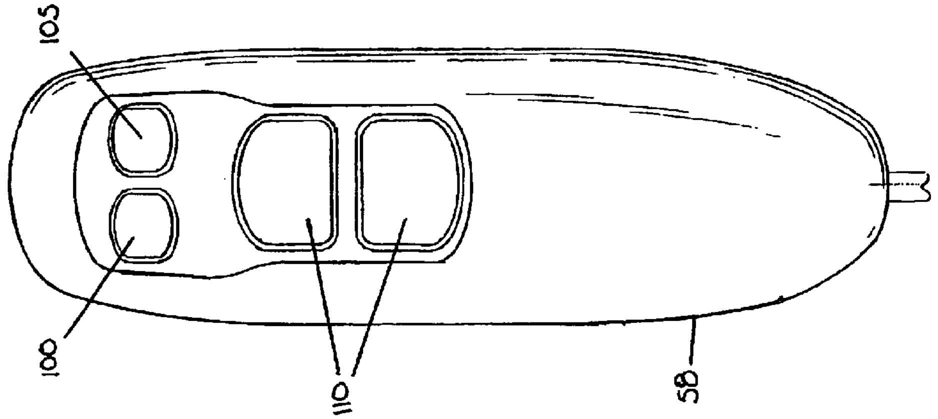

Yet another embodiment of the hand-held controller 58 is shown in FIGS. 10 and 11. As shown in FIGS. 10 and 1, the controller 58 includes two switches 100 and 105 for selectively controlling a change of a status of the powered apparatus between a locked state and an unlocked state. When a user operates the first switch 100, the control circuit 20 changes from the unlocked state to the locked state. When a user operates the second switch 105, the control circuit 20 changes from the locked state to the unlocked state after a predefined time period. In one configuration of Figs. 10 and 11, the control circuit 20 changes from the locked state to the unlocked state after a predefined time period of approximately two seconds. In other configurations of Figs. 10 and 11, the predefined time period is less than or greater than two seconds. Also in other configurations of FIGS. 10 and 11, the control circuit 20 changes from the unlocked state to the locked state when a user operates the first switch 100 for a predefined time period, such as two seconds. This predefined time period can be equal to, greater than or less than the predefined time period that elapses when the powered apparatus changes from the locked state to the unlocked state.

The controller 58 shown in FIGS. 10 and 11 also includes switches 110 that are operable to activate a plurality of functions, such as activating one or more motors 25 and 30, a heating system (not shown), a vibrating element (not shown), an air bladder system (not shown) and/or similar elements in the powered apparatus. In one configuration of FIGS. 10 and 11, each switch 110 activates a single function. In another configuration, each switch 110 is operable to activate more than one function.

Figure 12:
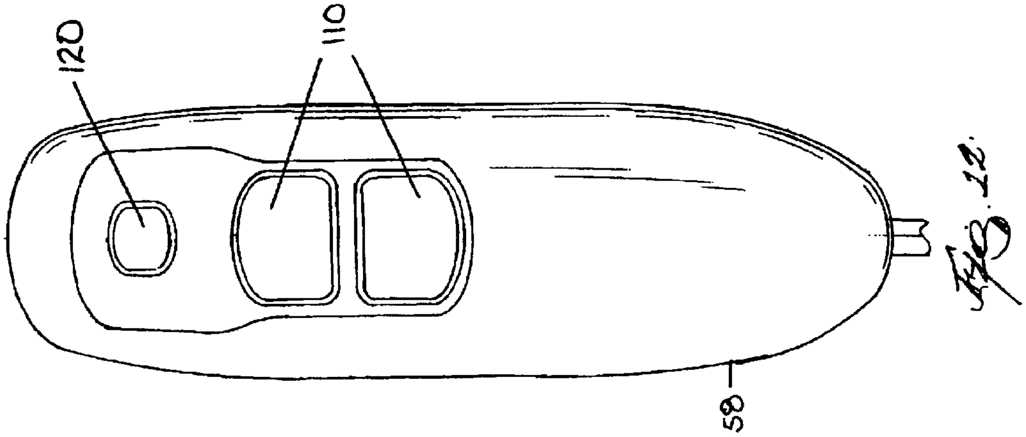

Yet a further embodiment of the controller 58 is shown in FIG. 12. As shown in FIG. 12, the controller 58 includes one switch 120 for selectively controlling a change of the status of the powered apparatus between the locked state and the unlocked state. When a user operates the switch 120 during a first occurrence or operation, the control circuit 20 changes from the unlocked state to the locked state almost immediately after the switch 120 is operated or after a first predefined time period. When a user operates the switch 120 during a subsequent occurrence, the control circuit 20 changes from the locked state to the unlocked state almost immediately after the switch 120 is operated or after a second predefined time period. In one configuration of this embodiment (not shown), the second predefined time period is greater than the first predefined time period. In other configurations, the second predefined time period is less than or approximately equal to the first predefined time period.

An example of the controller 58 as shown in FIG. 12 includes a first predefined time period of approximately two seconds, a second predefined time period of approximately five seconds and a powered apparatus in the unlocked state. In this example, when a user operates the switch 120 during a first occurrence for only one second, the control circuit 20 does not change from the unlocked state to the locked state since the first predefined time period of two seconds did not elapse. However, when the user operates the switch 120 during a subsequent occurrence and operates the switch 120 for approximately three seconds, the control circuit 20 changes from the unlocked state to the locked state since the first predefined time period of two seconds elapsed. When the user operates the switch 120 during a following occurrence and operates the switch 120 for approximately six seconds, the control circuit 20 changes from the unlocked state to the locked state since the second predefined time period of five seconds elapsed.

In this embodiment, the control circuit 20 only changes state once during a single occurrence or operation. That is, if the control circuit 20 is in the unlocked state and a user operates the switch 120 during a first occurrence for approximately eight seconds, the control circuit 20 would change from the unlocked state to the locked state after the first predefined time period of two seconds elapses. The control circuit 20 would not change from the locked state to the unlocked state after the second predefined time period of five seconds elapses, because the circuit 20 only changes one state during a single occurrence or operation. In other configurations of this embodiment, the control circuit 20 is capable of changing states multiple times during a single occurrence or operation.

The controller 58 shown in FIG. 12 also includes switches 110 that are operable to activate a plurality of functions, such as activating one or more motors 25 and 30, a heating system (not shown), a vibrating element (not shown), an air bladder system (not shown) and/or similar elements in the powered apparatus. In one configuration of FIG. 12, each switch 110 activates a single function. In another configuration, each switch 110 is operable to activate more than one function.

The control circuit 20 further includes a microprocessor 50 and memory 55 connected to the user entry circuit 45, the motor-control circuit 35 and the visual display circuit 40. The microprocessor 50 interprets and executes instructions stored as one or more software modules in memory 55. Upon executing the software modules, the microprocessor 50 receives inputs from the user entry circuit 45, processes the inputs and generates electrical outputs to the motor-control circuit 35 and/or the visual display circuit 40.

In operation, when the user manipulates the controller 58 to raise the chair, a signal is generated in the user entry circuit 45. The microprocessor 50 receives and interprets the input signal from the user entry circuit and generates an output to the motor control circuit 35. The motor control circuit 35 receives the generated output signal and controls the motors 25 and 30 accordingly to power the chair 10.

When the user actuates the single "lock" switch or the dual function switch, the controller 58 locks the chair. More specifically, the microprocessor 50 receives and interprets the input signal from the user entry circuit 45 resulting in the microprocessor 50 changing the state of the chair 10 from the unlocked state to the locked state. The microprocessor also generates an output signal to the visual display circuit 40. The visual display circuit 40 receives the generated output signal and activates a first LED informing the user that the chair 10 is in the locked state. While in the locked state, the microprocessor 50 does not generate an output signal to the motor control circuit 35 until the microprocessor 50 is actively returned to the unlocked state by the user.

The microprocessor 50 returns to the unlocked state when the user enters the correct input (combination of switches) into the user-entry circuit 45 or when the user operates the switch 105, 120 in the correct fashion (e.g., for the predefined time period). An input signal is generated in the user entry circuit 45 and is provided to the microprocessor 50. The microprocessor 50 receives and interprets the input signal resulting in the microprocessor 50 changing the state of the chair from the locked state to the unlocked state. The microprocessor 50 also generates an output signal to the visual display circuit.

Various features and advantages at the invention are set forth in the following claims.

What is claimed is:

1. A controller for a powered furniture item including a frame and a powered apparatus mounted on the frame, the controller comprising:

a control circuit coupled to the powered apparatus, the control circuit including at least two switches for selectively controlling a change of the status of the powered apparatus between a locked state and an unlocked state, the control circuit being operable to generate an output signal allowing control of the powered apparatus in the unlocked state and preventing control of the powered apparatus in the locked state, change from the unlocked state to the locked state when a user operates a first switch of the at least two switches, and change from the locked state to the unlocked state when a user operates a second switch of the at least two switches for a first predefined time period.

2. A controller as set forth in claim 1 wherein the first predefined time period is approximately two seconds.

3. A controller as set forth in claim 1 wherein the first predefined time period is approximately five seconds.

4. A controller as set forth in claim 1 wherein each of the switches is a push-button switch.

5. A controller as set forth in claim 1 wherein the first switch of the at least two switches is a multi-function switch, and wherein the control circuit changes from the unlocked state to the locked state in response to the user holding the first switch for a second predefined time period.

6. A powered movable chair comprising a frame;

a powered apparatus mounted to the frame to power the movable chair;

a controller including a control circuit coupled to the powered apparatus, the control circuit including at least two switches for selectively controlling a change of the status of the powered apparatus between a locked state and an unlocked state, the control circuit being operable to generate an output signal allowing control of the powered apparatus in the unlocked state and preventing control of the powered apparatus in the locked state, change from the unlocked state to the locked state when a user operates a first switch of the at least two switches, and change from the locked state to the unlocked state when a user operates a second switch of the at least two switches for a first predefined time period.

7. A chair as set forth in claim 6 wherein the first predefined time period is approximately two seconds.

8. A chair as set forth in claim 6 wherein the first predefined time period is approximately five seconds.

9. A chair as set forth in claim 6 wherein each of the switches is a push-button switch.

10. A chair as set forth in claim 6 wherein the first switch of the at least two switches is a multi-function switch, and wherein the control circuit changes from the unlocked state to the locked state in response to the user holding the first switch for a second predefined time period.

11. A method of controlling a powered movable furniture item including a powered apparatus connected to the item and a control circuit coupled to the powered apparatus, the control circuit including at least two switches controllable by a user and being operable to provide output signals to the powered apparatus to change the status thereof between a locked and an unlocked state, the method comprising the acts of:

changing from the unlocked state to the locked state when the user operates only a first switch of the at least two switches; and changing from the locked state to the unlocked state when the user operates only a second switch of the at least two switches for a first predefined time period approximately greater than about one second.

12. A method as set forth in claim 11 wherein the first switch of the two switches is a multi-function switch and wherein the act of changing from the unlocked state to the locked state includes the act of changing from the unlocked state to the locked state when the user holds the first switch for a second predefined time period.

* * * * *